United States Patent [19]

Beck

[11] Patent Number: 5,558,888

[45] Date of Patent: Sep. 24, 1996

[54] INJECTION MOLDING NOZZLE HEATER CLAMP

[75] Inventor: John P. Beck, Savage, Minn.

[73] Assignee: Rosemount Aerospace Inc., Burnsville, Minn.

[21] Appl. No.: 266,966

[22] Filed: Jun. 27, 1994

[51] Int. Cl.$^6$ .................................................. B29C 45/23
[52] U.S. Cl. ........... 425/549; 264/328.15; 425/DIG. 245
[58] Field of Search ...................... 425/549, DIG. 245; 264/328.15; 219/535, 536, 542, 544, 546, 221

[56] References Cited

U.S. PATENT DOCUMENTS

| | | | |
|---|---|---|---|
| 2,456,423 | 12/1948 | Jobst | 18/30 |
| 2,820,133 | 1/1958 | Norton | 219/38 |
| 3,244,236 | 4/1966 | Langham | 170/173 |
| 4,268,241 | 5/1981 | Rees et al. | 425/549 |
| 4,613,296 | 9/1986 | Nagasaka | 425/547 |
| 4,875,845 | 10/1989 | Hara et al. | 425/143 |
| 4,940,870 | 7/1990 | Shibata et al. | 219/10.491 |
| 4,968,247 | 1/1990 | Olson | 219/535 X |
| 5,113,576 | 5/1992 | van Boekel et al. | 29/611 |
| 5,267,375 | 12/1993 | Lasmar | 24/268 |
| 5,360,333 | 11/1994 | Schmidt | 425/549 |

FOREIGN PATENT DOCUMENTS 590621 4/1994 European Pat. Off. .
653283 5/1995 European Pat. Off. .

OTHER PUBLICATIONS

"Band and Nozzle Heaters" brochure pp. 53–60 Watlow Electric Heater Manufacturing Company, St. Louis, Missouri, Publication date unknown.

*Primary Examiner*—Robert Warden
*Assistant Examiner*—Krisanne M. Thornton
*Attorney, Agent, or Firm*—Westman, Champlin & Kelly, P.A.

[57] ABSTRACT

A clamp for clamping heater assemblies onto cylindrical bodies such as injection molding nozzles that require heating. The clamp includes a mandrel that slips over the nozzle, and has a heater wound on the exterior. The mandrel has a longitudinal slit that will permit the bore of the mandrel to be reduced in size when a lateral width of the slit is reduced. The mandrel carries outwardly facing cam surfaces, and an overlying sleeve has inwardly facing cam surfaces which mate, and upon relative longitudinal movement, the cam surfaces cause the lateral width of the slit to reduce and clamp the mandrel onto the nozzle. The clamping can be effected by differential movement due to differences in thermal expansion of the mandrel and the sleeve, or by mechanical movement of the sleeve relative to the mandrel to obtain the cam action.

15 Claims, 4 Drawing Sheets

INJECTION MOLDING NOZZLE HEATER CLAMP

BACKGROUND OF THE INVENTION

The present invention relates to a clamp for clamping a mandrel onto a cylindrical body to provide intimate contact between the mandrel and the body, and particularly for clamping a heater onto the exterior of an injection molding nozzle.

Cylindrical heater assemblies are clamped onto injection molding nozzles for insuring good thermal conduction from the heater to the nozzle to maintain the temperature of the nozzle at an adequate level. The heaters and nozzles require periodic maintenance and replacement, and thus it is desirable to have the ability to easily remove the heater from the nozzle for maintenance. The heaters and nozzles are generally recessed in a cavity so the ability to clamp and release the heater easily without operating mechanism within the cavity is desirable.

In the past many types of heater clamps have been advanced, including thermal clamps which were designed to automatically clamp onto the injection molding nozzle as the temperature of the heater increased. Prior art thermal clamps have had a spool or mandrel on which a heater is mounted, with the spool or mandrel having a bore large enough to slip over the heater nozzle. The heater may be surrounded by an outer housing that is also cylindrical, and which has a different coefficient of thermal expansion from the spool. The concept of this type of device was to provide for radially inward clamping because of the differential in expansion between the heater mounting spool or mandrel and other components, to cause the mandrel to tighten down onto the surface of the nozzle for heat transfer purposes.

The amount of differential thermal expansion in a radial direction is many times insufficient to provide an adequate clamping force onto the injection molding nozzle when the mandrel bore is large enough so it can be slipped over the nozzle.

The present invention utilizes a longitudinal actuated camming arrangement for tightening the mandrel on which the heater is mounted onto a body using mechanical or thermally caused longitudinal differential movement between mandrel and an outer housing.

SUMMARY OF THE INVENTION

The present invention relates to a clamp for clamping a mandrel onto a cylindrical body received in a bore of the mandrel using a cam action. In a preferred embodiment, the mandrel has a heater mounted on its outer surface and is intimately clamped to the outer surface of an injection molding nozzle to be heated.

A cam assembly operates between a portion of the mandrel and an outer retainer or sleeve that mounts over the mandrel. The cam includes mating cam surfaces, on the sleeve and mandrel, as shown, an outwardly facing surface on at least one end of the mandrel, and an inwardly facing cam surface formed on the outer retainer or sleeve. Longitudinal movement between the mandrel and sleeve causes clamping of the mandrel onto the nozzle surface. The mandrel is longitudinally slit in at least one place so that a gap in the mandrel circumference is formed in a desired clamp region. As shown, the slit extends along the entire length. The cam action tends to reduce the gap and provide a clamping force.

In one form of the embodiments illustrated, the cam action is achieved by differential thermal expansion of the mandrel relative to the sleeve in longitudinal directions. The length of the mandrel changes to provide the cam operation and clamping action as opposed to radial changes in dimension. The cams in the one preferred embodiment are at both ends of the mandrel, so that as the mandrel expands longitudinally at a greater rate than the outer sleeve, clamping occurs. The sleeve also may have the higher coefficient of expansion if the cam surfaces are properly oriented.

The slit extending longitudinally in the mandrel permits the mandrel to tighten down onto an injection molding nozzle and permits the mandrel to expand enough when cool (at ambient temperature) to permit the mandrel to be easily slid off one end of the nozzle and back onto the nozzle. The nozzles usually are accessible from one end.

A second embodiment utilizes a mechanically operated cam wherein the mandrel is placed over the nozzle, and the outer housing is mechanically shifted longitudinally to clamp the mandrel onto the nozzle. Cams are provided at both ends of the heater assembly. After the cams seat, the outer sleeve is latched into its clamped position. The latch is made so that it can be released when desired from the accessible end of the nozzle and heater. In the second embodiment, a tab is utilized for holding the outer sleeve and the mandrel together in a partially assembled condition for ease of shipping and handling.

The preferred embodiments take advantage of the use of longitudinal shifting between the mandrel and sleeve for obtaining a cam action for clamping using either thermal actuation or mechanical actuation.

DETAILED DESCRIPTION OF THE PREFERRED EMBODIMENTS

Figure 1:
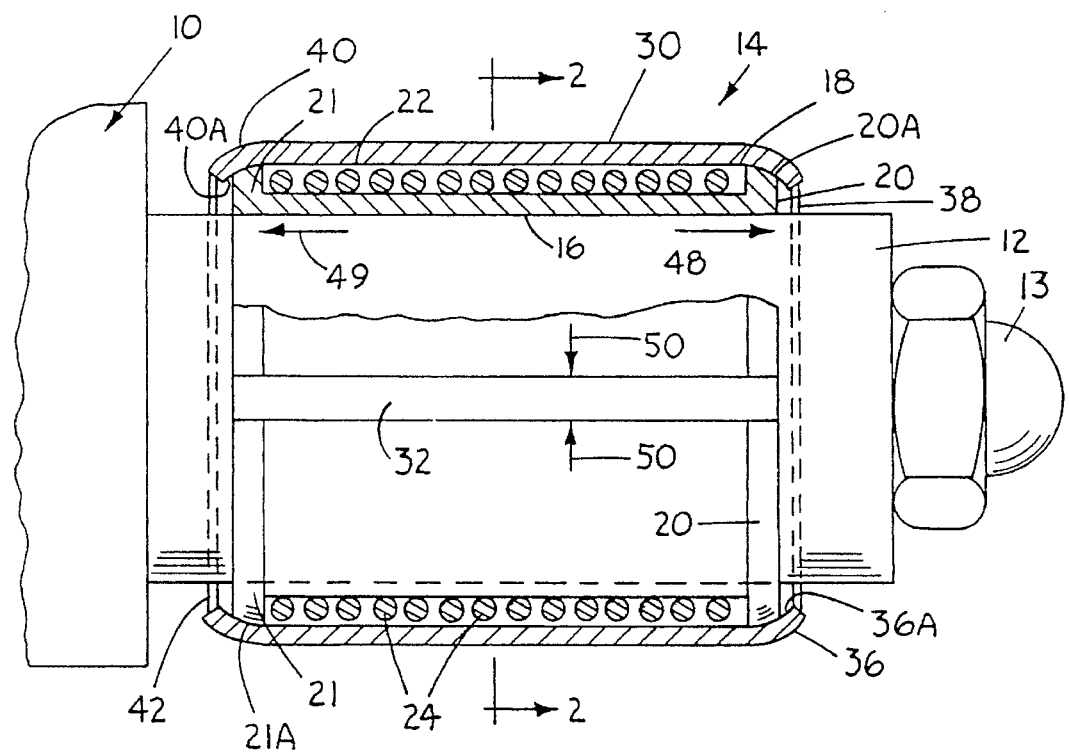
FIG. 1 is a sectional view of a heater assembly made according to the present invention shown installed on an injection molding nozzle to be heated.

Referring first to FIG. 1, an injection molding machine illustrated fragmentarily and generally at 10 has an injection molding nozzle barrel 12 with a nozzle end 13 that is used for injecting materials into a mating die. It is important in the molding process to have the materials being expelled by the nozzle end 13 at a temperature that is sufficiently high to make the materials flow adequately, and thus having heaters surrounding the nozzle barrel 12 to control the material temperature sufficiently is a standard practice.

Figure 2:
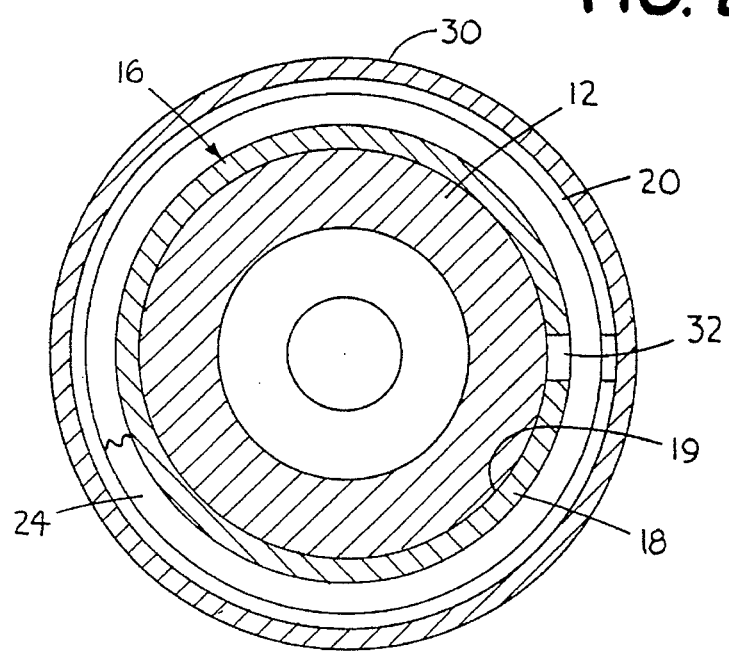
FIG. 2 is a sectional view taken as on line 2—2 in FIG. 1.
Figure 3:
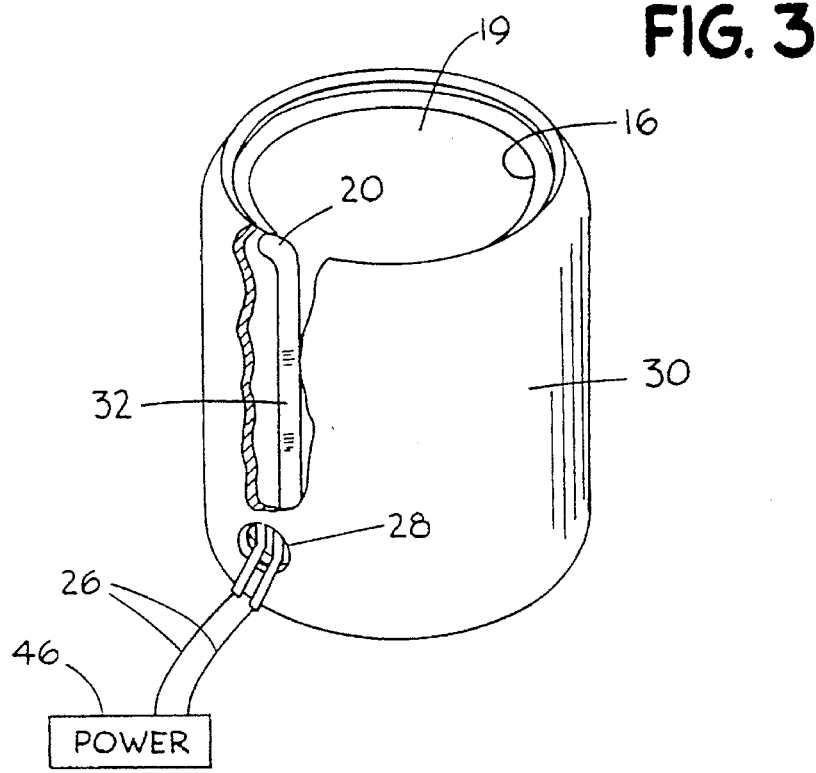
FIG. 3 is a perspective view of the heater assembly shown in FIG. 1.

In the first embodiment of the present invention a heater assembly indicated generally at 14 is made to be self clamping onto the outer cylindrical surface of the nozzle barrel 12. The heater assembly 14 includes a spool or mandrel 16 which includes a central cylindrical tubular shell 18 that has a bore 19 (FIGS. 2 and 3) of sufficient diameter to slide around the cylindrical outer surface of the nozzle barrel 12. The mandrel is provided with radially extending end flanges 20 and 21, which are annular flanges positioned at opposite ends of the tubular shell 18 and which extend radially outwardly from the outer surface of the tubular shell, as shown. The flanges 20 and 21 form an annular recess 22 that is of size to receive a helically wound electric heater wire indicated generally at 24. The heater has suitable leads indicated at 26 (FIG. 3) that extend out an aperture or opening 28 provided in an outer sleeve or retainer 30 of the heater assembly 14.

The mandrel 16 is slit longitudinally on one side and has a longitudinally extending gap 32. The slit passes through the tubular shell 18 as well as the end flanges 20 and 21, so that the mandrel bore 19 can be reduced in internal size by applying forces to the outside of the mandrel to squeeze it down and narrow the gap.

The sleeve 30, as shown, is made of a material that has a relatively low coefficient of expansion such as titanium or steel, and is made to be slightly longer than the mandrel 16. The sleeve 30 has an end portion 36 that is rolled or formed, either before assembly on the mandrel or after assembly so it reduces in diameter to a smaller diameter opening 38 than the diameter of the main portion of the sleeve. The opening 38 is of smaller diameter than the outer peripheral edges of the annular flanges 20 and 21 of the mandrel.

The inner surface 36A of the end portion 36 of sleeve thus tapers to a smaller diameter at a desired taper angle or configuration, and the outer surface 20A of the annular flange 21, is also angled or configured so that the two surfaces 20A and 36A are complementary and form camming surfaces that will slide relative to each other for clamping.

The opposite or inner end of the sleeve 30 has an end portion 40 that is rolled over or formed after the mandrel 16 has been placed into position inside the sleeve with the heater 24 wound on the mandrel in recess 22. The rolling or forming of the end 40 forms inner surface 40A into an inwardly facing cam surface in the same manner as surface 36A. The opening 42 at the end 40 of the sleeve 30 is of smaller diameter than the outer surface of the end flange 21 on the mandrel. The outer surface 21A of flange 21 is angled or formed to mate with surface 40A and forms a cam in connection with the surface 40A. The mandrel is then tight inside the sleeve and retained in place so both cams will act to clamp the mandrel by tending to reduce the gap 32 of the slit as the cams operate.

After the heater assembly 14 has been formed, as shown in cross section in FIG. 1 and the heater assembly is "cold", (at ambient temperature) the end flanges 20 and 21 of the mandrel are positioned inwardly from the end surfaces 36A and 40A of the sleeve 30. The bore 19 of mandrel 16 may be compressed by cam action until the bore 19 is at its design size. This can be done by placing a gage pin of proper size in the mandrel bore and forming the sleeve until the cams cause the mandrel to tighten down onto the gage pin. Then the bore 19 is properly sized. The heater assembly then can be slid or moved inwardly over the nozzle barrel 12 from the nozzle end. The sliding fit of the bore 19 is kept close so the mandrel can be clamped onto the nozzle barrel 12 with little movement of the cams and only a small closing of the gap 32.

Then, when heat is applied by providing power from a suitable source 46 to the leads 26, and thus to the heater 24, the temperature will rise, causing the nozzle barrel 12 to expand, and also causing expansion of the mandrel 16 and sleeve 30. The mandrel 16 is preferably selected to be of a metallic material that has a relatively high coefficient of expansion for example aluminum. This will cause expansion of the mandrel 16 in longitudinal directions indicated by arrows 48 and 49 in FIG. 1. Radial thermal expansion that aids in clamping is also present, but the longitudinal dimension change insures adequate clamping by cam action.

The outer sleeve 30 is selected to have a coefficient of expansion that is in the form shown less than that of the mandrel 16, so that as the assembly heats up, the amount of expansion of the sleeve 30 in longitudinal direction is less than that of the mandrel 16. This means that the end flanges 20 and 21 will move toward the opposite end cam surfaces 36A and 40A on the sleeve, resulting in a sliding of the cam surfaces to provide a force tending to radially compress the mandrel, due to the cam action between the surfaces 36A, 20A and the 40A, 21A. This cam action will cause the edges of the tubular shell 18 that are on opposite sides of the gap 32 to be forced inwardly as indicated by the arrows 50, to thereby reduce the diameter of the bore 19 in mandrel 16 and tightly clamp the mandrel onto the surface of the nozzle barrel 12.

The cam action is caused by relative longitudinal movement between the outer sleeve 30 and the mandrel 16. The clamping is automatic and positive.

The heater assembly 14 is formed by leaving at least one of the end portions 36 or 40 of the sleeve 30 cylindrical, and then slipping the sleeve over a subassembly of the mandrel 16 and heater wire 24 into the sleeve. After the mandrel 16 is inside the sleeve, a gage pin can be placed in the bore 19 and the one or both end portions 36 and 40 can be rolled over to form the inwardly facing cam surfaces and to adjust for desired bore size. The method allows for greater tolerances in the mandrel and sleeve.

In this form of the invention, the mandrel 16 could be made longer than the sleeve, and flanges at opposite ends of the mandrel were rolled up, or added as separate parts to provide cam surfaces facing inwardly toward the heater and sleeve. The ends of the sleeve would be provided with outwardly facing cam surfaces to engage the cam surfaces on the flanges of the mandrel. In such configuration the sleeve would have a higher coefficient of thermal expansion than the mandrel to obtain the thermal clamping.

The second embodiment of the invention shown in FIGS. 4–7 comprises a heater assembly indicated at 60 which includes an inner mandrel 61 that has a tubular shell 62, with a bore 59 through the center and on one end thereof has an annular flange 63 similar to the flange 20 shown in FIG. 1. However, in this form of the invention the mandrel 61 has a base or head end 64 at an opposite end of the shell 62 from flange 63. The head end forms an annular plug. The bore of the mandrel extends through the head end and is of size to receive an injection molding nozzle. The head end has an exterior part conical section 66 that has a camming surface 67 on the outer surface thereof.

A heater 68 is wound onto the recess formed by the annular flange 63, and the conical section 66, and is wrapped around the outer surface of the tubular shell 62 of the mandrel 61. The mandrel 61 also has a longitudinal slit 65 that forms a gap and extends through flange 63 and head end 64.

An outer sleeve in this form of the invention indicated at 70 has an inner end 71 that is cylindrical and of size to fit over the flange 63, and the wound heater 68. The sleeve 70 has an outer end portion 72 that is rolled over and reduces in diameter to provide an inner surface 72A that also reduces in diameter and forms a cam surface that is complementary to a cam surface 63A on flange 63.

The outer sleeve 70 has a first triangular tab 74 partially punched out of the sleeve and directed inwardly. Tab 74 is bent inwardly from of the surface of the outer sleeve, so that when the mandrel 61 is slid into the sleeve 70 from end 71 of the sleeve, the tab 74 will be resiliently forced outwardly under urging of the annular flange 63 and then will move into place partially in a recess 75 in the annular flange 63 and partially behind the flange 63 to prevent the mandrel 61 from backing out of the sleeve 70. The tab 74, resting in the recess 75 will also restrain rotation of the sleeve 70 relative to the mandrel 61.

Figure 4:
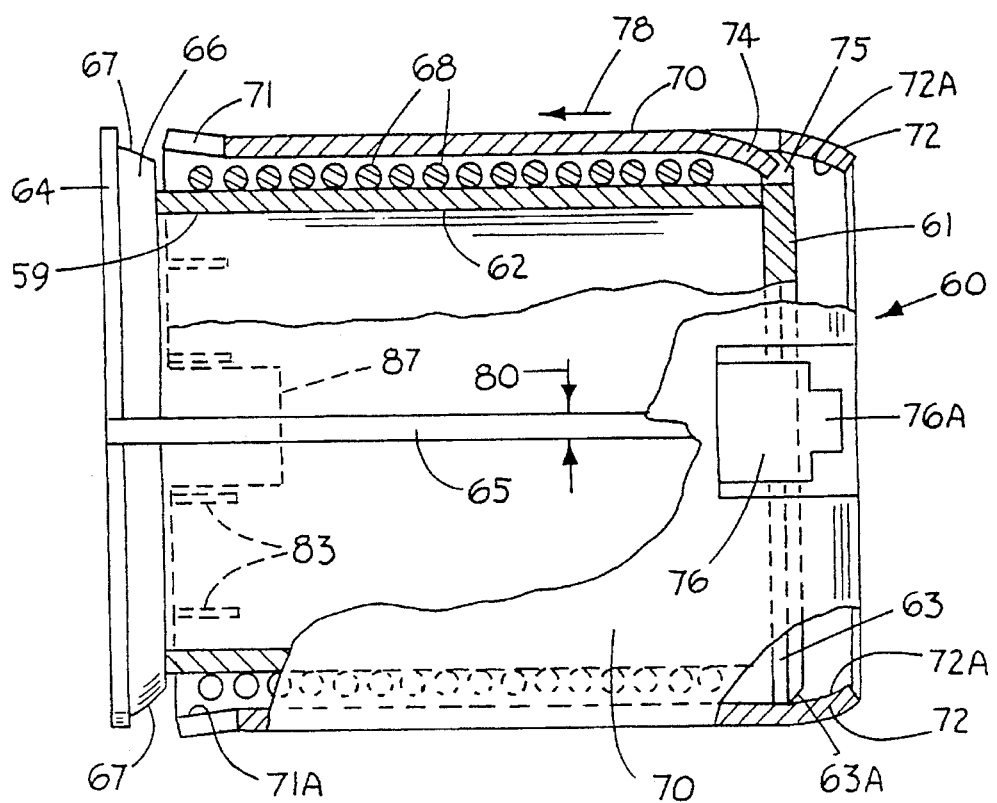
FIG. 4 is a longitudinal sectional view of a second embodiment of the present invention with parts in section and positioned for installation on an injection molding nozzle.

Additionally, the sleeve 70 is provided with a locking tab 76 that is adjacent the outer end 72. The locking tab 76 overlies the slit 65 when the tab 74 is in recess 75. The tab 76 has an end projection 76A that fits into the gap or slit 65 at the outer end of the mandrel, and also has shoulders 76B that are wider than the slit 65. When the sleeve 70 is in its position as shown in FIG. 4, before the mandrel is tightened down onto an injection molding nozzle, the locking tab 76 is merely disengaged from any part of the mandrel. Tab 74 will retain the sleeve from sliding axially off the mandrel.

In this form of the invention, when the mandrel 61 has been slid over an injection molding nozzle, and is properly positioned, a suitable force will be applied to the sleeve 70 while the mandrel 61 is held, either by retaining it relative to a portion of the injection nozzle, using spacers or using a special tool, and the sleeve is moved in direction as indicated by the arrow 78 relative to the mandrel 61. This movement will cause the outer cam surface 63A formed on the annular flange 63, to engage against the surface 72A. Also the inner surface 71A of cylindrical end 71 will slide on surface 67 of the head end of the mandrel to tend to close the gap of slit 65 formed in the mandrel 61.

Figure 5:
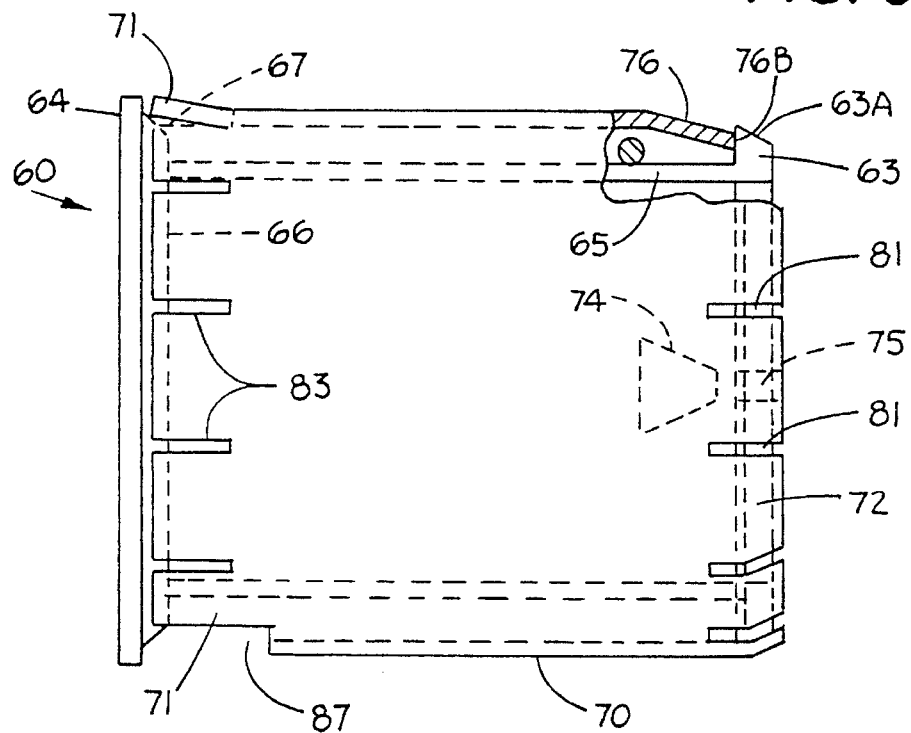
FIG. 5 is a side view of the embodiment of the invention shown in FIG. 4 with the parts in a clamped position and with parts in section.
Figure 6:
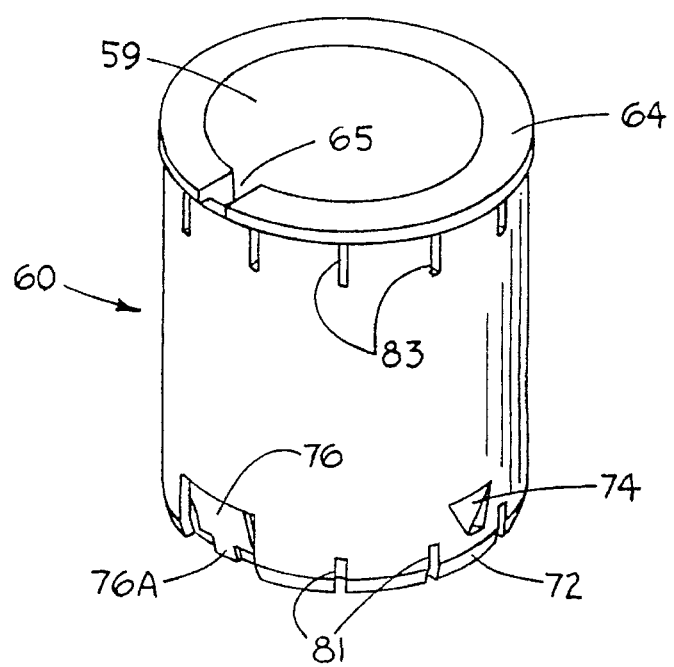
FIG. 6 is a perspective view of the embodiment of FIG. 4.

Once the sleeve 70 has been slid all the way onto the mandrel and over cam surfaces 63A and 67 of the mandrel 61, and 71A and 72A of the sleeve the cam surfaces will cause the mandrel 61 to compress and reduce the diameter of the mandrel bore 59 to clamp onto the associated injection molding nozzle when the inner end of sleeve 70 is near the end of the head portion 64 of the mandrel 61. The shoulder 76B lock tab 76 will snap in behind the flange 63 of the mandrel, and will hold the sleeve from moving. This is shown in FIG. 5, where the end projection 76A has been broken away to show tab 76 engaging the inner radial surface of flange 63. The cams will be held so that the mandrel 61 will be clamped onto a molding nozzle tightly by the cam action. The arrows 80 indicate the clamping action across the gap 65.

The outer sleeve 70 preferably may have slits 81 partially extending in from the end portion 72, so that the cam surface 72A has some additional resiliency or spring loading and ability to expand. This resiliency will aid in permitting the surfaces to slide together to provide adequate clamping action. Likewise, the end 71 of the sleeve 70 that engages the cam surface 67 has slits 83 therein also permitting the sleeve wall to yield slightly as the sleeve is slid into position over the cam surfaces. A notch 87 can be cut out for electrical leads leading to the heater 68.

Figure 7:
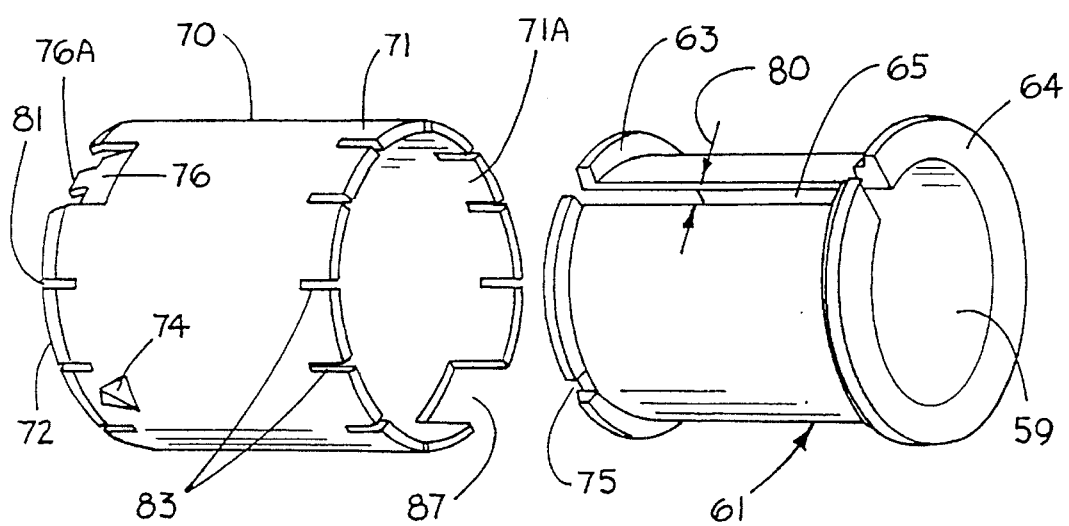
FIG. 7 is a simplified exploded view of the embodiment of FIG. 4 to illustrate the assembly of the heater assembly.

As can be seen in FIG. 7, the assembly of the mandrel 61 and the sleeve 70 (in FIG. 7 the heater wire is not shown in place) can be done by merely slipping the sleeve into position over the mandrel 61, and once the tab 74 has come in sufficiently far behind the recess 75 in flange 63 so that the sleeve 70 is retained on the mandrel, the heater assembly is ready to be shipped to the user. This is a partially assembled condition, but insures that the parts will not be separated during shipping or handling. The bore 59 in the mandrel 61 remains the proper size so that it can be easily slipped over an injection molding nozzle such as that shown in FIG. 1, and then the mandrel and sleeve can be relatively longitudinally shifted mechanically in the second form of the invention so that the tab 76 locks behind the flange 63 and holds the cam surfaces in positive engagement.

By proper selection of material, thermal clamps also can be incorporated in the second form of the invention to increase the clamping load after installation and loading with tab 76.

FIG. 7 illustrates essentially the configuration of the mandrel for the first form of the invention, except in the first form of the invention the annular flanges are used at both ends of the mandrel, and the head end is not as large, nor does it have an outside cam surface oriented to clamp when the sleeve is slid over the mandrel.

While one slit is shown in the mandrels, the mandrels could have one or several longitudinal slits extending inwardly from each end of the mandrel to permit the cams to reduce the diameter of the mandrel bore at the ends.

Using one full length longitudinal slit has the advantage that the gap width can be made fairly wide and the entire bore length reduced as desired. This permits one mandrel to be used on a range of different diameter nozzles by proper initial adjustment of the cams to reduce the bore diameter to a desired size. Also, the heater may be wound tightly enough to reduce the gap so the spring back of the heater wire after winding would be compensated for by spring back of the mandrel to keep the heater tightly wound.

The sleeve in both forms of the invention is a retainer that serves to activate the cams for clamping action. The slits shown in the sleeve of the second embodiment also can be used with the first embodiment.

The embodiments shown provide positive clamping of mandrels onto cylindrical bodies and particularly take advantage of thermal expansion in the mandrel in longitudinal direction where total change is sufficient to provide cam generated movement for clamping. Radial changes of dimension from thermal expansion also are present to supplement the cam clamping forces.

The materials used can be selected from a range of materials with different (or the same) coefficients of thermal expansion. Aluminum may be used for the mandrel, for example with a titanium or steel outer sleeve for the first form of the invention. The sleeve material for the invention has to be capable of being formed to provide cam surfaces.

Although the present invention has been described with reference to preferred embodiments, workers skilled in the art will recognize that changes may be made in form and detail without departing from the spirit and scope of the invention.

What is claimed is:

1. A heater assembly for use on a cylindrical member, comprising:

a mandrel having a mandrel longitudinal length and a bore of sufficient size to receive a cylindrical member to be heated and having an outer surface;

a heater carried on the outer surface of the mandrel and coiled around the mandrel along the length thereof, said mandrel having a cam surface on a first end thereof that tapers relative to a longitudinal axis of the mandrel, the mandrel having at least one longitudinal slit having a width that permits the bore to reduce in size when the slit reduces in width; and a sleeve that surrounds and is spaced from a substantial portion of the outer surface of the mandrel to form a space for the heater, the sleeve also being spaced outwardly from the heater, said sleeve having a complementary end cam surface on a first end thereof for engaging the at least one cam surface on the mandrel, one of the sleeve and mandrel having a higher coefficient of thermal expansion than the other of the sleeve and mandrel so that upon heating the sleeve and mandrel with the heater to a temperature above room temperature a differential longitudinal movement between the sleeve and the mandrel occurs, a second end of the sleeve and a second end of the mandrel being configured to restrain longitudinal movement induced by differential thermal expansion between the sleeve and the mandrel, the engaging cam surfaces causing forces when the sleeve and the mandrel have relative differential longitudinal movement to reduce the slit width to thereby clamp the mandrel onto a cylindrical member on which the mandrel is mounted substantially solely under cam generated forces.

2. The heater assembly of claim 1, wherein the at least one complementary surface of the sleeve is at one end thereof, and wherein the sleeve has a plurality of longitudinally extending slits extending through the complementary surface, said slits being spaced annularly around the sleeve.

3. The heater assembly of claim 1, wherein the mandrel has flanges at opposite ends thereof, the at least one cam surface comprise two annularly extending cam surfaces on the outer edges of the flanges at opposite ends of the mandrel, said cam surfaces at opposite ends of the mandrel facing in opposite longitudinal directions, the sleeve having two complementary end cam surfaces.

4. The heater assembly of claim 3, wherein the sleeve has portions at both ends thereof forming the two complementary surfaces facing toward the cam surfaces on the mandrel, the mandrel being shorter than the sleeve and having a length so that the cam surfaces on the mandrel and the two complementary surfaces on the sleeve are operably associated under ambient temperatures prior to energizing the heater, the mandrel having a coefficient of thermal expansion sufficient to cause the cam surfaces and complementary surfaces to operably engage and slide to provide the force on the mandrel to clamp the mandrel when the heater is energized and reaches a preselected temperature.

5. A clamp for a cylindrical body forming an injection molding nozzle comprising;

a mandrel that has a bore of size to slidably fit over the cylindrical body, said mandrel having a substantially cylindrical outer surface portion and slit extending longitudinally on one portion thereof to form a gap which can reduce in width to reduce the size of the bore in the mandrel to clamp onto the cylindrical body;

a first cam surface on the mandrel that tapers in radial directions and longitudinally and is at a first end of and joins the substantially cylindrical outer surface portion;

a cylindrical sleeve mounted over said mandrel, said cylindrical sleeve overlying and being spaced from the mandrel cylindrical outer surface and having a second mating cam surface at a first end to mate with said first cam surface of the mandrel, the mandrel having a third cam surface at a second end of the mandrel spaced in a longitudinal direction from the first cam surface, the second end of the sleeve having a fourth cam surface engaging the third cam surface, the second and fourth cam surfaces overlying and surrounding the first and third cam surfaces so that upon relative longitudinal movement between the mandrel and the retainer, the second and fourth cam surfaces cause slidable engagement of the facing first and third cam surfaces to reduce the width of the gap and clamp the mandrel onto the cylindrical body, the sleeve and mandrel being in contact substantially only at the respective engaging cam surfaces.

6. The clamp of claim 5, wherein the mandrel is shorter than the sleeve, and the second and fourth cam surfaces facing toward each other and surrounding the first and third cam surfaces, the mandrel having a coefficient of thermal expansion greater than the sleeve such that the thermal expansion of the mandrel when at a known temperature causes the longitudinal dimension of the mandrel to increase so the cam surfaces and create a force to reduce the width of the gap to clamp the mandrel.

7. The clamp of claim 6, wherein the mandrel ms shorter than the sleeve and has a third cam surface at a second end, the second end of the sleeve having a fourth cam surface engaging the third cam surface, the second and fourth cam surfaces overlying and surrounding the first and third cam surfaces.

8. A heater assembly for use on a cylindrical member to be heated, comprising:

a mandrel having a bore of sufficient size to slide over a cylindrical member to be heated;

a heater wound on the mandrel around an exterior surface portion thereof, said mandrel having spaced apart flanges at opposite ends of the exterior surface portion between which the heater is wound, and said flanges extending radially outward farther than the heater and having cam surfaces formed at outer edges thereof spaced outwardly from the exterior surface portion that face outwardly and taper relative to a longitudinal axis of the mandrel;

a sleeve that slides over the mandrel, and substantially surrounds and is spaced from the heater on the mandrel, said sleeve having complementary cam surfaces for engaging the cam surfaces on the flanges of the mandrel when the sleeve and the mandrel have relative differential longitudinal movement, said mandrel having at least one slit from the exterior to the bore ant extending longitudinally therein, so that upon longitudinal differential movement between the sleeve and the mandrel, the cam surfaces on the sleeve ace on the cam surfaces of the mandrel such that the bore of the mandrel reduces in diameter as the slit closes to tend to clamp onto a cylindrical member over which the mandrel is slid.

9. The heater assembly of claim 8, in which the sleeve has ends which are formed to be of smaller diameter than the outer edges of the flanges and which overlap the flanges to trap the mandrel between the sleeve ends, and wherein the mandrel has a higher coefficient of thermal expansion than the sleeve so that upon energizing the heater and heating the heater assembly differential longitudinal expansion causes longitudinal movement between the mandrel and the sleeve to cause the cam action to reduce the mandrel diameter.

10. The heater assembly of claim 8, wherein the sleeve is slidable relative to the mandrel for causing the cam action when a longitudinal force is applied to the sleeve.

11. The heater assembly of claim 10 and a tab carried on the sleeve to engage a portion of the mandrel to retain the sleeve relative to the mandrel with the cam surfaces of the mandrel disengaged from the complementary surface of the sleeve.

12. The heater assembly of claim 11 wherein the cam surfaces of the mandrel are formed on both flanges and face in the same direction and the sleeve has complementary surfaces that engage the cam surfaces simultaneously, and a lock between the mandrel and the sleeve to retain the sleeve relative the mandrel with the cam surfaces and the complementary surfaces engaged.

13. The heater assembly of claim 8, wherein the complementary surfaces of the sleeve are an at least one end thereof, and the sleeve having a plurality of longitudinally extending sleeve slits extending through the camming surfaces, said sleeve slits being spaced annularly around the sleeve.

14. The heater assembly of claim 8, wherein the mandrel flanges have cam surfaces on the outer edges of the flanges that extend annularly around the mandrel, said cam surfaces at opposite ends of the mandrel facing in opposite directions, and facing away from center portions of the mandrel.

15. The heater assembly of claim 14 wherein the sleeve complementary surfaces at both ends thereof to form cam surfaces facing inwardly toward the mandrel, said mandrel being shorter than the sleeve and having a length so that the cam surfaces on the mandrel and on the sleeve are operably disengaged under ambient temperatures prior to energizing the heater, and the mandrel having a thermal coefficient of expansion to expand longitudinally when the heater is energized to operably engage the cam to reduce the size of the bore of the mandrel.

* * * * *

UNITED STATES PATENT AND TRADEMARK OFFICE
CERTIFICATE OF CORRECTION

PATENT NO. : 5,558,888
DATED : September 24, 1996
INVENTOR(S) : John P. Beck

It is certified that error appears in the above-indentified patent and that said Letters Patent is hereby corrected as shown below:

Col. 8, line 6, cancel "retainer" and insert --cylindrical sleeve--.

Col. 8, line 21, cancel "ms" and insert --is--.

Col. 8, line 46, cancel "ant" and insert --and--.

Col. 8, line 49, cancel "ace" and insert --act--.

Signed and Sealed this

Fourth Day of March, 1997

*Attest:*

BRUCE LEHMAN

*Attesting Officer*     Commissioner of Patents and Trademarks